April 16, 1968     H. JENKNER ET AL     3,378,593
PREPARATION OF 2,3-DIBROMOPROPANOL
Filed Dec. 10, 1965
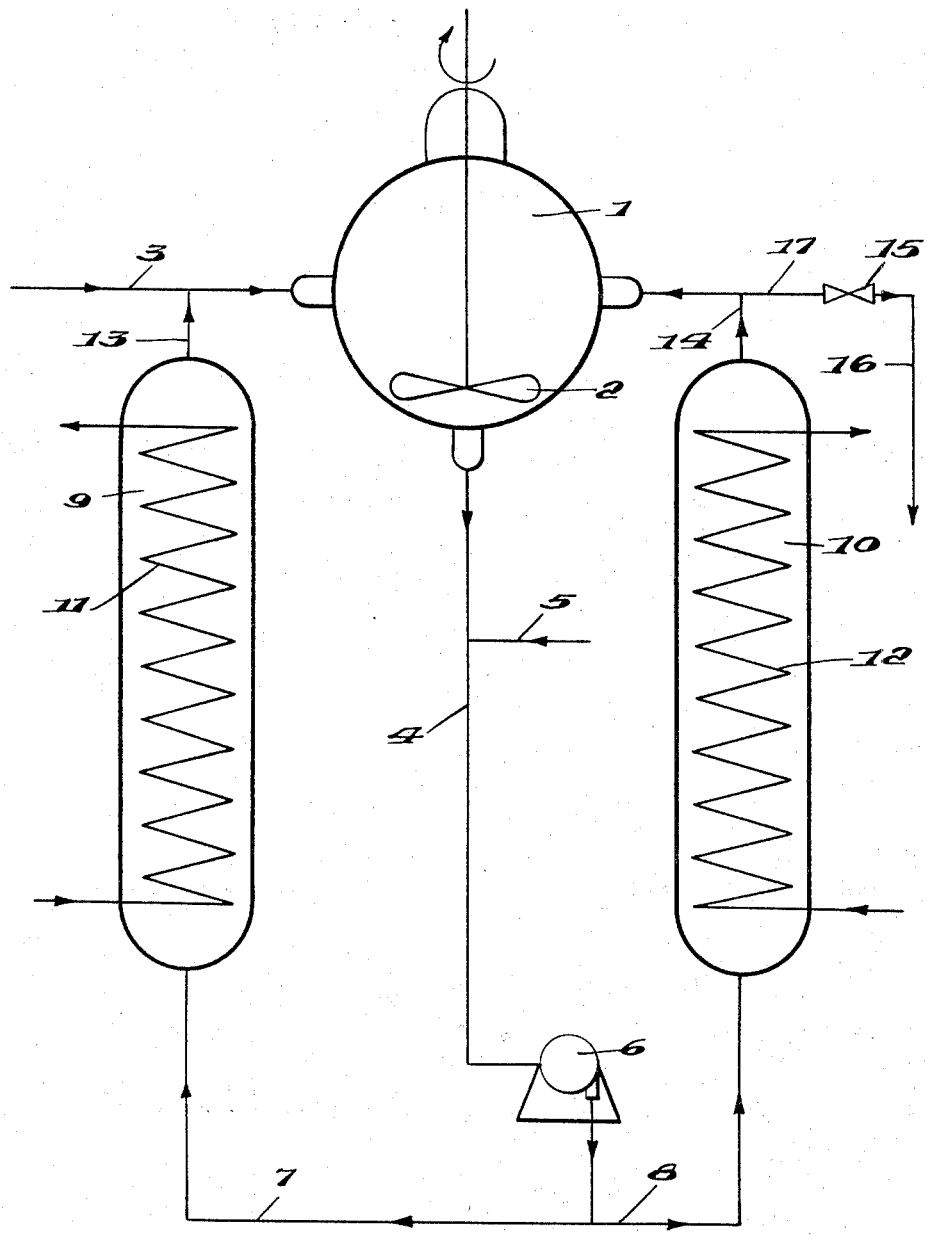
INVENTORS
HERBERT JENKNER,
OTTO RABE,
BY Bailey, Stephens & Huettig
ATTORNEYS United States Patent Office 3,378,593
Patented Apr. 16, 1968

3,378,593
PREPARATION OF 2,3-DIBROMOPROPANOL
Herbert Jenkner, Cologne-Deutz, and Otto Rabe, Cologne-Hohenberg, Germany, assignors to Chemische Fabrik Kalk G.m.b.H., Cologne-Kalk, Germany
Filed Dec. 10, 1965, Ser. No. 512,987
Claims priority, application Germany, Dec. 14, 1964, C 34,635
2 Claims. (Cl. 260—633)

ABSTRACT OF THE DISCLOSURE

Process for the production of 2,3-dibromopropanol by reaction of about equimolar quantities of allyl alcohol and bromine wherein allyl alcohol is first mixed with 2,3-dibromopropanol in a molar ratio of 1:1 to 1:8, and the bromine is introduced into the resulting mixture and the reaction temperature is maintained at 10–20° C. In the continuous embodiment the allyl alcohol and bromine are supplied to and mixed with the 2,3-dibromopropanol at spaced locations and the quantities supplied are such that the reaction mixture exhibits only a weakly reddish color and the 2,3-dibromopropanol produced is withdrawn from the reaction mixture.

The present invention relates to an improved process for the production of 2,3-dibromopropanol.

As is known, 2,3-dibromopropanol can be prepared by the addition of elemental bromine on allyl alcohol. In such process the elemental bromine, either as such or in the form of a solution, is introduced into a vessel containing allyl alcohol which advantageously also is diluted with a solvent such as water, chloroform, carbon disulfide and the like. Bromine in vapor form can also be caused to act slowly on allyl alcohol. However, such brominations are accompanied by side reactions, some of which can lead to the formation of hydrogen bromide. Tribromopropane and water are formed by reaction of the hydrogen bromide with the alcoholic hydroxyl group. Most varied substitution and condensation products are formed through other side reactions. As these by-products can only be separated with difficulty and incompletely by distillation from the desired 2,3-dibromopropanol, it has been proposed that the bromination of allyl alcohol should be carried out in the presence of acid and water binding agents, such as weakly basic oxides, carbonates as acid acceptors and calcium chloride, sodium sulfate, silica gel, anhydrides of lower fatty acids as water binding agents.

The thus described bromination of allyl alcohol is advantageously carried out at a temperature of about 5° C. In order to eliminate the high viscosity of allyl alcohol and the 2,3-dibromopropanol produced at this low temperature, this process is advantageously carried out in the presence of a solvent, such as carbon tetrachloride. According to this known procedure the greater part of the products of the side reactions are converted into compounds which may be separated more easily from the 2,3-dibromopropanol than the products of the side reactions themselves. However, the side reactions are not suppressed thereby and the dibromopropanol product obtained by such process has too high a bromine content and too low a content in alcoholic hydroxyl groups.

It is an object of the present invention to provide a process for the production of 2,3-dibromopropanol, the purity of which suffices for most technical applications while avoiding the above mentioned side reactions.

According to the invention it was found that this object could be achieved if allyl alcohol is first mixed with 2,3-dibromopropanol in a molar ratio of 1:1 to 1:8, preferably 1:3 to 1:6, and introducing about an equimolar quantity (with reference to the allyl alcohol) of bromine into such mixture while maintaining a temperature of about 10–20° C. in the reaction mixture.

The process according to the invention can be carried out continuously or discontinuously. In the discontinuous mode of operation the allyl alcohol is first throughly mixed with the 2,3-dibromopropanol to produce a mixture containing 1 to 8 mols of 2,3-dibromopropanol per mol of allyl alcohol and then adding a quantity of bromine thereto which is about equimolar with respect to the allyl alcohol.

However, it also is possible to add the allyl alcohol and the bromine to the 2,3-dibromopropanol simultaneously if they are supplied at sufficiently spaced locations while thorough intermixture of the reaction mixtures is maintained so that the allyl alcohol is diluted with 1 to 8 mols of 2,3-dibromopropanol before coming into reactive contact with the bromine being supplied.

In a continuously operating process it also is necessary that the allyl alcohol and the bromine are supplied to the 2,3-dibromopropanol provided in the reaction phase at sufficiently spaced locations. The velocity at which such additions are made should be such that the temperature of the reaction mixture does not exceed 10 to 20° C. and that the reaction mixture only has a weak reddish coloration. The 2,3-dibromopropanol which is continuously produced is continuously withdrawn at a third location in a quantity corresponding to the quantity of allyl alcohol supplied.

Cooling is effected to maintain the temperature of the reaction mixture at 10 to 20° C.

The accompanying drawing schematically shows an apparatus in which the continuous embodiment of the process according to the invention can be carried out advantageously.

Referring to the drawing, the apparatus, which is originally provided with a filling of 2,3-dibromopropanol, comprises the mixing vessel 1 which is provided with stirrer 2. Allyl alcohol is continuously supplied to the volume of 2,3-dibromopropanol maintained in the mixing vessel 1 through conduit 3. The mixture which is formed in mixing vessel 1 is drawn off through conduit 4, into which the bromine required is introduced through conduit 5. The reaction mixture is then supplied with the aid of pump 6 through conduits 7 and 8 to coolers 9 and 10 which contain cooling coils 11 and 12 through which a cooling medium is passed. The reaction mixture leaves cooler 9 through conduit 13 and enters conduit 3 where it is mixed again with allyl alcohol and recycled to mixing vessel 1. A portion of the reaction mixture leaving cooler 10 through conduit 14 is drawn off over regulating valve 15 and conduit 16 as finished product whereas the other portion is recycled to the mixing vessel 1 over conduit 17.

A reaction mixture of low viscosity is attained by the dilution of the reaction mixture with 2,3-dibromopropanol and the separate supply of the allyl alcohol and the bromine at spaced locations. Furthermore, localized overheating which initiates the undesired side reactions cannot occur with such mode of operation. The use of 2,3-dibromopropanol as diluent renders it unnecessary to add a foreign diluent to the reaction mixture which would have to be separated from the reaction product after completion of the reaction. According to the invention it is possible to obtain 2,3-dibromopropanol in good yields in such purity that it suffices for most technical applications. If very high purity requirements must be met, the products can be given a further purification treatment such as, for example, a distillation under vacuum.

The following example will serve to illustrate the process of the invention with reference to the apparatus disclosed in the drawing. In such example the proportions are given by weight unless specified otherwise.

EXAMPLE 85 parts of 2,3-dibromopropanol were provided in an apparatus as shown in the drawing so that the whole arrangement was filled therewith with the exception of mixing vessel 1 which was only about ⅓ filled. 5 parts of allyl alcohol per hour were continuously supplied through conduit 3 to this quantity of 2,3-dibromopropanol which was originally provided and simultaneously the corresponding quantity of the resulting mixture was withdrawn from mixing vessel 1 through conduit 4. 13.8 parts of bromine per hour were continuously supplied over conduit 5 to the mixture flowing through conduit 4. The reaction mixture leaving conduit 4 was then passed through coolers 9 and 10 with the aid of pump 6 in order to maintain a temperature between 10 and 20° C. in the recycled reaction mixture. The reaction product formed was supplied from cooler 9 through conduit 13 to conduit 3 through which it was mixed with fresh allyl alcohol and recycled back to the mixing vessel 1. The reaction product leaving cooler 10 was supplied to conduits 16 and 17 over conduit 14. A quantity of reaction product, corresponding to the quantity of allyl alcohol supplied per unit of time, is withdrawn as end product from conduit 16. The other portion of the reaction mixture was recycled to mixing vessel 1 through conduit 17.

The reaction product withdrawn from the cycle through conduit 16 still contained 1 to 3% of free bromine. This, however, completely reacted in a further reaction period of 0.5 to 1 hour at 20° C. The yield of technically pure 2,3-dibromopropanol containing 73.8% of bromine and 7.5% of free carboxyl groups with reference to the allyl alcohol supplied was 97.7% of theory.

To effect high grade purification of the product it only was necessary to subject it to vacuum distillation and to take off first runnings of about 5% of the total volume. The 2,3-dibromopropanol thus purified had a bromine content of 73.5% (theoretical 73.4%) and a hydroxyl group content of 7.7% (theoretical 7.8%).

We claim:

1. In a process for the production of 2,3-dibromopropanol by reaction of about equimolar quantities of allyl alcohol and elemental bromine, the steps of first mixing the allyl alcohol with 2,3-dibromopropanol in a molar ratio of 1:1 to 1:8, introducing the bromine into the resulting mixture and maintaining a reaction temperature between 10 and 20° C., the allyl alcohol and bromine being supplied continuously to and mixed with the 2,3-dibromopropanol at locations spaced from each other, the quantities supplied being such that the reaction mixture only exhibits a weakly reddish color and continuously withdrawing a quantity of 2,3-dibromopropanol equivalent to the allyl alcohol and bromine supplied from the reaction mixture at a third location.

2. The process of claim 1 in which the molar ratio of allyl alcohol to 2,3-dibromopropanol in the mixture is between 1:3 to 1:6.

References Cited
UNITED STATES PATENTS

| | | | |
|---|---|---|---|
| 3,268,597 | 8/1966 | Clemons et al. | 260—633 |
| 3,283,013 | 11/1966 | Rimmer | 260—633 |

BERNARD HELFIN, *Acting Primary Examiner.*

LEON ZITVER, *Examiner.*

H. MARS, *Assistant Examiner.*